United States Patent [19]

MacDonald et al.

[11] Patent Number: 4,748,380
[45] Date of Patent: May 31, 1988

[54] COMPACT FLUORESCENT LAMP ASSEMBLY HAVING IMPROVED THERMAL DISSIPATION AND RFI SUPPRESSION

[75] Inventors: Wallace T. MacDonald, Tewksbury; Frank M. Latassa, Magnolia, both of Mass.

[73] Assignee: North American Philips Corporation, New York, N.Y.

[21] Appl. No.: 536,403

[22] Filed: Sep. 27, 1983

[51] Int. Cl.⁴ .......................... H01J 7/44; H01J 17/34; H01J 23/16; H01J 29/96
[52] U.S. Cl. ........................................ 315/57; 315/50; 315/85; 313/46; 313/242
[58] Field of Search ........................ 315/50, 51, 56, 57, 315/58, 62, 85; 313/46, 242

[56] References Cited

U.S. PATENT DOCUMENTS

| | | | |
|---|---|---|---|
| 4,156,829 | 5/1979 | Harada | 315/85 X |
| 4,270,071 | 5/1981 | Morton | 315/58 X |
| 4,383,200 | 5/1983 | Van Zon et al. | 315/57 |
| 4,449,072 | 5/1984 | Osada | 315/58 |
| 4,453,109 | 6/1984 | Stupp et al. | 315/DIG. 7 X |
| 4,464,607 | 8/1984 | Peil et al. | 315/209 R |

Primary Examiner—Saxfield Chatmon
Attorney, Agent, or Firm—Jack E. Haken; Emmanuel J. Lobato

[57] ABSTRACT

A fluorescent lamp assembly having an electronic ballast circuit. A ballast circuit transformer is mounted on a metallic plate having a recess complementary to the transformer, and the metallic plate suppresses conducted RFI. A lamp cover is attached to the metallic plate and heat from the ballast circuit transformer is dissipated by the metallic plate and lamp cover.

7 Claims, 3 Drawing Sheets

COMPACT FLUORESCENT LAMP ASSEMBLY HAVING IMPROVED THERMAL DISSIPATION AND RFI SUPPRESSION

SUMMARY OF THE INVENTION

The present invention relates to a compact fluorescent lamp assembly, and more particularly to a compact fluorescent lamp assembly having structure for improving thermal dissipation and for suppressing radio frequency interference.

Compact fluorescent lamp assemblies have in recent years attracted considerable interest because of their potential for substantial energy savings. Major efforts by the lighting industry have been made to develop a compact fluorescent lamp assembly which is a direct replacement for an incandescent lamp and which requires substantially less energy to operate than an incandescent lamp of comparable light output.

Two problem areas which must always be considered when making a compact fluorescent lamp assembly are the problems presented by heat dissipation and radio frequency interference. Any compact fluorescent lamp assembly which is to gain acceptance in the consumer market as a direct replacement for incandescent lamps must use a ballast circuit which is small and lightweight. This can be accomplished through the use of an electronic ballast circuit, however electronic ballast circuits are particularly susceptible to thermal problems and can substantially contribute to radio frequency interference.

The problem of heat dissipation is exacerbated the more compact the fluorescent lamp assembly under consideration, because less area and mass will be available to function solely as a radiator to dissipate heat. Electronic ballast circuits impose even more stringent requirements for maximum temperature control than do conventional ballast circuits. Thus, the combination of an electronic ballast circuit in a compact fluorescent lamp assembly imposes severe heat dissipation requirements on the lamp assembly.

The use of an electronic ballast circuit also exacerbates the problem of radio frequency interference. Electronic ballast circuits typically operate at frequencies of the order of several tens of kilohertz. At such high operating frequencies radio frequency interference of non-negligible intensity is common, and Federal Communication Commission regulations may preclude the use of certain types of lamps if the radio frequency interference generated by the lamps is too strong. Shielding may be used to reduce unwanted radio frequency interference, however, effective shielding can contribute substantially to the bulk of the device being shielded, and consequently the incorporation of effective shielding into the lamp may prevent the lamp assembly from being made compact.

Accordingly, it is an object of the present invention to provide a compact fluorescent lamp assembly which may directly replace an incandescent lamp of the type intended for the consumer market.

Another object of the invention is to provide a compact fluorescent lamp assembly having an electronic ballast, which can dissipate sufficient heat during operation so as to avoid excessive heating of the electronic ballast circuit.

Another object of the present invention is to provide a compact fluorescent lamp assembly which emits only low level radio frequency interference.

A lamp assembly according to the claimed invention includes a fluorescent lamp and a high frequency electronic ballast circuit. The electronic ballast circuit includes a transformer for driving the fluorescent lamp. A metallic mounting plate has first and second opposite major surfaces and a recess in the first of the major surfaces shaped complementary to the shape of the transformer. Lamp mounting means is effective for mounting the fluorescent lamp on the second major surface of the mounting plate. Ballast circuit mounting means is provided for mounting the ballast circuit transformer on the first of the major surfaces with the transformer positioned within the recess in the mounting plate. The transformer is positioned within the recess to effectuate radio frequency interference shielding of the ballast circuit transformer by the mounting plate and to dissipate heat in the transformer windings and other components of the ballast circuit.

The transformer of the ballast circuit has a major length dimension and minor transverse dimensions, and the recess in the first major surface of the mounting plate likewise has a major length dimension and minor transverse dimensions. The major length dimension of the recess is oriented parallel to the mounting plate with the recess minor dimensions transverse to the mounting plate. The mounting plate surface portion defining the recess and the transformer are dimensioned to closely fit to permit heat flow by conduction from the transformer into the mounting plate.

In a preferred embodiment of the invention, the transformer of the ballast circuit is generally cylindrical, and the recess in the mounting plate is generally semi-cylindrical.

The fluorescent lamp is mounted on the second side of the mounting plate opposite the first side to which the ballast circuit is mounted.

DETAILED DESCRIPTION OF THE INVENTION

Figure 1:
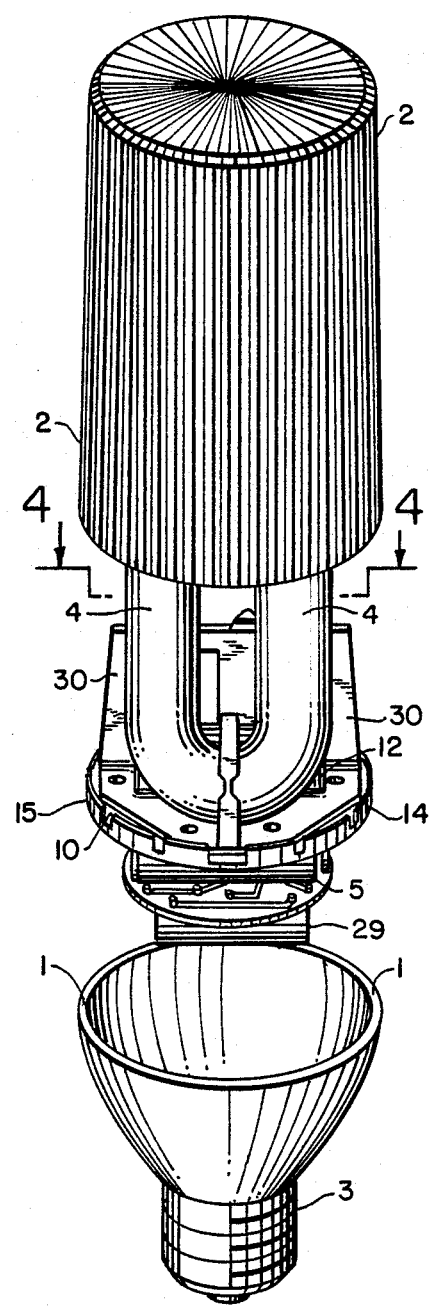
FIG. 1 is a vertical sectional view of the compact fluorescent lamp assembly according to the present invention.

FIG. 1 illustrates a lamp assembly according to the invention comprised of a base shell 1 having a light-transmissive cover 2 attached thereto. An Edison screw base 3 is mounted at the bottom of the base shell 1, and a fluorescent lamp 4 is housed within the light-transmissive cover 2. An electronic ballast circuit having a transformer 5 is housed within the base shell 1 for energizing the fluorescent lamp 4. In operation, the Edison screw base 3 is threaded into a standard incandescent lamp socket, and a conductive circuit path is established through the Edison screw base 3 to the ballast circuit for energizing the fluorescent lamp 4.

The mounting plate 9 constitutes the mechanical mounting structure for mounting the fluorescent lamp 4 and the transformer 5. Additionally, as described in detail below, the mounting plate 9 is also effective to provide radio frequency interference shielding of the transformer 5 and to dissipate excessive heat so as to prevent thermal damage to the electronic ballast circuit.

In the illustrated preferred embodiment the mounting plate 9 is comprised of a plate element 10 having an opening 11 therethrough which is dimensioned to receive the transformer 5. A thin cup-like shell 12 is mounted on the plate element 10 with its concave surface facing the opening 11 and with its convex surface protruding away from the upper surface or second surface of the mounting plate 9. The shell 12 defines a recess open at the opening 11 and it is dimensioned to receive the transformer 5 of the electronic ballast circuit.

The mounting plate 9 comprised of the plate element 10 and shell 12 is metallic and thermally conductive. The shell 12 is dimensioned to fit closely around the transformer 5 and thermal conductive caulking material 13 is disposed to fill the gap between the transformer 5 and the shell 12. The material 13 ensures a thermally conductive path between the transformer 5 and the mounting plate 9. Heat from the ballast circuit transformer will flow through the material 13 and into the mounting plate 9 which will dissipate the heat by radiation and conduction.

The upper or second surface of the mounting plate 9 has a plurality of upstanding tabs 14, 15 mounted thereon. These tabs press firmly against the inner surface of the light transmissive cover 2 and provide a thermal flow path for heat to flow from the mounting plate 9 to the cover 2.

The preferred material for the base shell 1 and the light transmissive cover 2 is a polycarbonate. In practice, a polycarbonate light transmissive cover approximately two and five-eights inches in diameter and four and one-half inches high, mounted on a base shell which tapers from a two and seven-eights inch maximum diameter down to the one and three-thirty second inch diameter of the Edison screw base and which has a height of two and three-quarter inches has proven effective to dissipate the excessive heat generated by an 18 Watt lamp and ballast circuit housed therein. The diameter of the mounting plate was approximately 2.65 inches and upstanding tabs 14, 15 had a height of approximately 0.42 inches and were effective to provide sufficient heat transfer from the mounting plate 9 to the light transmissive cover 2 in order to maintain the temperatures of the various ballast circuit components at acceptable levels. It was found experimentally that even a 30% reduction in the height of the tabs 14, 15 resulted in an unacceptable increase in the temperature of the ballast circuit components.

The mounting plate 9 also is an effective radio frequency interference (RFI) shield for the transformer 5. Experimental tests have shown that the ballast circuit and mounting plate combination meets or exceeds the standards set forth in FCC Rules, Part 18, Sub-part H and Part 15 for conducted radio frequency interference.

Figure 2:
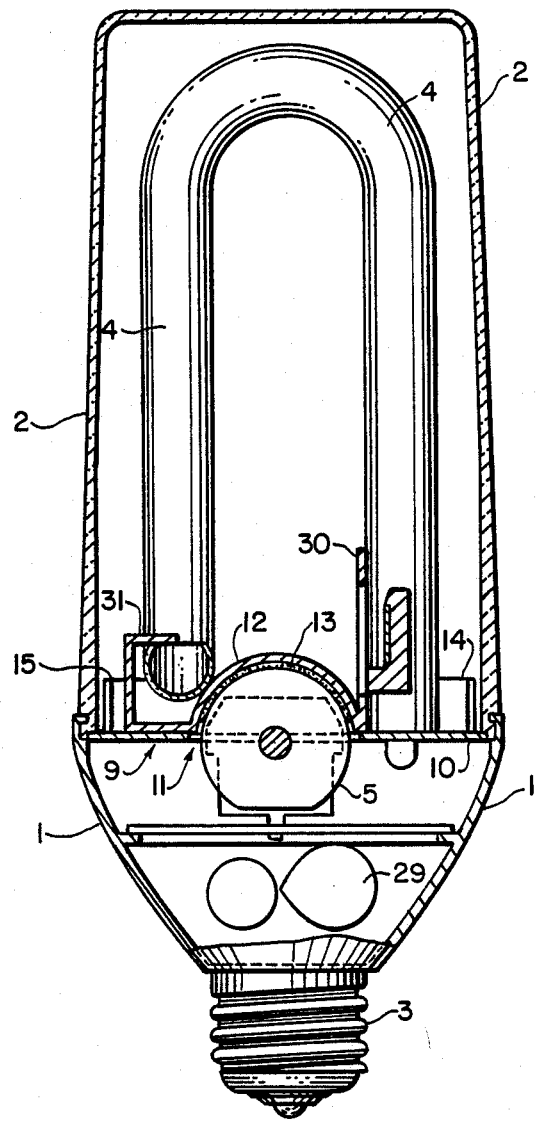
FIG. 2 is another vertical sectional view of the compact fluorescent lamp assembly shown in FIG. 1 taken along a vertical plane perpendicular to that of FIG. 1.

The structure for mounting the ballast circuit transformer 5 in the recess of the mounting plate 9 is shown in FIG. 2 and is comprised of an end plate 20 bearing against one end face of the ballast circuit transformer 5. The end plate 20 extends downwardly from the lower or first surface of the plate element 10 and is formed from a reverse-folded portion 21 of the plate element 10 which is adjacent the edge of the opening 11 through the plate element 10. The end plate 20 has an aperture 22 therethrough.

The ballast circuit transformer 5 has a central rod 23 having an end flange 24 with a diameter larger than that of the rod 23. The end flange 24 is dimensioned to fit in the aperture 22 of the end plate 20 so that the end plate 20 is effective for mounting and positioning one end of the ballast circuit transformer 5.

The transformer rod 23 has a second end 25 which protrudes slightly from an end face of the transformer 5. A resilient spring clip 26 is disposed between the end face of the transformer 5 and a mounting bracket 27 which extends downwardly from the lower or first face of the mounting plate 9. The mounting bracket 27 is spaced from the opposing end face of the transformer 5, and the spring clip 26 is disposed between the end face of the transformer 5 and the mounting bracket 27. The resilient spring clip 26 is maintained in a compressed condition and holds the ballast circuit transformer 25 against the end plate 20 with the transformer rod end flange 24 held in the aperture 22.

The end plate 20, the spring clip 26 and the mounting bracket 27 together constitute mounting means for mounting the ballast circuit transformer 5 in the recess of the mounting plate 9. The end plate 20 and the mounting bracket 27 also provide structure for mounting the circuit board 28 of the ballast circuit. Electronic components 29 of the ballast circuit are mounted on the circuit board 28. The circuit board 28 rests on an internal flange of the base shell 1, and the flange provides a support for the assembly comprised of the ballast circuit board 28, the ballast transformer 5 and the mounting plate 9.

Structure for mounting the fluorescent lamp tube on the mounting plate 9 is shown in FIGS. 1 and 2. An upstanding bracket 30, extending upwardly from the upper or second surface of the mounting plate 9, bears against the fluorescent tube 4 to hold it in place. The mounting bracket 30 is shown as an integral element of the shell 12. A second mounting bracket 31 extends upwardly from the upper or second surface of the mounting plate 9 and engages the fluorescent lamp 4. The second mounting bracket 31 is likewise an integral element of the shell 12.

Figure 3:
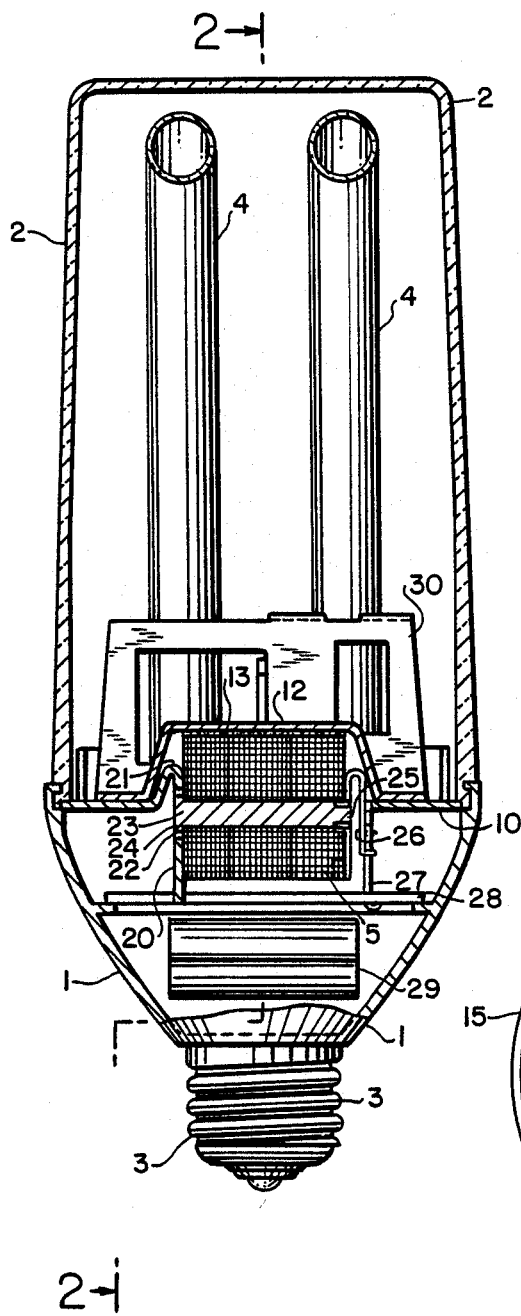
FIG. 3 is a plan view of the mounting plate of the lamp assembly shown in FIGS. 1 and 2.
Figure 4:
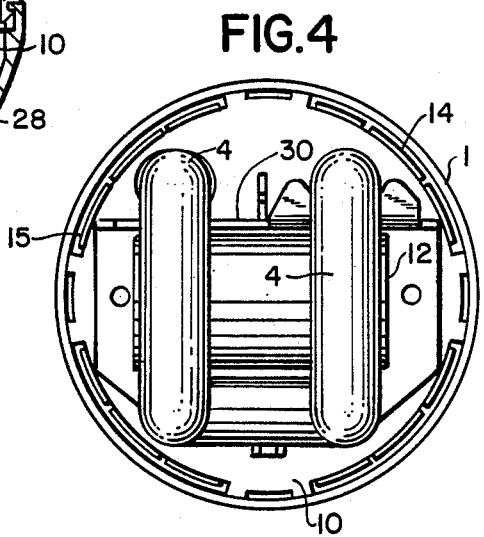

FIG. 3 is a plan view of the mounting plate 9 and shows the locations of the tabs 14, 15 which make contact with the light transmissive cover 2. FIG. 3 also shows how the mounting bracket 30 engages the fluorescent lamp 4.

Although the mounting plate 9 is shown, in the preferred embodiment, as being comprised of a plate element 10 and a separate shell 12, it will be clear to one skilled in the art that the mounting plate 9 can be made from a single piece. In that case, the recess defined by the shell 12 would be formed in the plate-like mounting plate. The mounting brackets for the fluorescent lamp need not be comprised of a portion of the mounting plate; instead they can be separate elements attached to the mounting plate.

What is claimed:

1. In a lamp assembly having a fluorescent lamp and a high frequency electronic ballast circuit having a transformer for driving said fluorescent lamp, the improvement comprising: a metallic mounting plate having first and second opposite major surfaces and a recess in the first of said major surfaces shaped complementary to the shape of said transformer; lamp mounting means for mounting said fluorescent lamp on the second major surface of said mounting plate; and ballast circuit mounting means for mounting said ballast circuit on the first of said major surfaces with said transformer positioned within said recess to effectuate conducted radio frequency interference shielding of said ballast circuit transformer by said mounting plate and dissipation of heat from said ballast circuit transformer by said mounting plate.

2. In a lamp assembly according to claim 1, said lamp mounting means being effective for mounting said fluorescent lamp in a generally upstanding position relative to the second major surface of said mounting plate; said transformer having a major length dimension and minor transverse dimensions; and said mounting plate shaped with said recess major dimension oriented parallel to said mounting plate and with said recess minor dimensions transverse to said mounting plate.

3. In a lamp assembly according to claim 1, said mounting plate is a thin plate-like element with said recess formed in the first major surface of said mounting plate and a bulge protrudes from the second major surface of said mounting plate on the opposite side from said recess, said recess is formed having a major length dimension oriented generally parallel to said mounting plate and with a minor depth dimension extending into said mounting plate, and said bulge has a major length dimension oriented generally parallel to said mounting plate and with a minor height dimension protruding above said second major surface of said mounting plate.

4. In a lamp assembly according to claim 1, a light-transmissive cover positioned covering said fluorescent lamp and the second major surface of said mounting plate, and heat transfer means for transferring heat from said mounting plate to said cover when said cover is in the position covering said fluorescent lamp and the first major surface of said mounting plate.

5. In a lamp assembly according to claim 4, wherein said heat transfer means is comprised of thermally conductive tabs disposed at the periphery of said mounting plate upstanding from the second major surface of said mounting plate and contacting an inner surface of said cover for defining a thermal flow path from said mounting plate to said cover, and wherein said light-transmissive cover is comprised of a material having a thermal conductivity sufficiently high so that said light-transmissive cover substantially contributes to the dissipation of heat.

6. In a lamp assembly according to claim 1, said ballast circuit operates at approximately 30 KHz.

7. In a lamp assembly according to claim 1, said transformer has a generally cylindrical shape, and said recess in the second major surface of said mounting plate has a generally semi-cylindrical shape and is dimensioned to closely fit said transformer to permit heat flow by conduction from said transformer to said mounting plate.

* * * * *